United States Patent [19]

Yano et al.

[11] Patent Number: 5,000,766
[45] Date of Patent: Mar. 19, 1991

[54] SUCTION SYSTEM GAS SEPARATOR FROM FLUID

[75] Inventors: Hisashi Yano; Junsuke Yabumoto, both of Kanagawa, Japan

[73] Assignee: Mitsubishi Oil Co., Ltd., Tokyo, Japan

[21] Appl. No.: 401,397

[22] Filed: Aug. 31, 1989

[30] Foreign Application Priority Data

May 30, 1989 [JP] Japan .................... 1-134747
Jun. 7, 1989 [JP] Japan .................... 1-142942

[51] Int. Cl.⁵ .............................. B01D 19/00
[52] U.S. Cl. .......................... 55/204; 55/417; 55/431
[58] Field of Search ............ 55/191, 204, 417, 431, 55/432

[56] References Cited

U.S. PATENT DOCUMENTS

| | | | |
|---|---|---|---|
| 2,878,889 | 3/1959 | Gilbert | 55/204 |
| 3,163,508 | 12/1964 | Tuck et al. | 55/204 |
| 3,359,708 | 12/1967 | Barber | 55/191 |
| 3,771,290 | 11/1973 | Stethem | 55/205 |
| 4,273,563 | 6/1981 | Fadda et al. | 55/189 |
| 4,865,632 | 9/1989 | Yano et al. | 55/204 |
| 4,878,924 | 11/1989 | Yano et al. | 55/204 |

FOREIGN PATENT DOCUMENTS 2105926 10/1971 Fed. Rep. of Germany ........ 55/204
1144833 3/1969 United Kingdom .

Primary Examiner—Jay H. Woo
Assistant Examiner—C. Scott Bushey
Attorney, Agent, or Firm—Sughrue, Mion, Zinn, Macpeak & Seas

[57] ABSTRACT

A compact and efficient separator for removing both entrained bubbles and dissolved gases from fluid. Fluid containing gases is introduced tangentially into a vortex flow chamber which is disposed at the suction-side of a pump. The fluid, which is stripped of gaseous contaminants, flows out of the vortex flow chamber while gas-rich fluid collected near center of the chamber passes into a gas removal pipe which is communicated to a suction device.

8 Claims, 4 Drawing Sheets

SUCTION SYSTEM GAS SEPARATOR FROM FLUID

BACKGROUND OF THE INVENTION

In industrial applications requiring the handling of fluids such as water, lubricants, chemical solutions, liquid foodstuffs, etc., often it is necessary to remove gaseous contaminants from the fluid to prevent problems such as rust formation, the generation of annoying noise during the movement of industrial fluids, oil starvation in lubrication systems, inefficiency and inaccuracy in hydraulic systems, and nonuniform quality in chemical or foodstuff materials.

In order to remove gaseous contaminants from those fluids, devices employing buoyancy and/or centrifugal force have been used, examples of which are disclosed in U.S. Pat. Nos. 2,511,967, 3,771,290, and 4,790,762, and U.K Patent No. 1,144,833.

No compact and efficient device has heretofore been known, however, which is capable of simultaneously removing both entrained bubbles and dissolved gases in a fluid under a reduced pressure condition.

Such a device is particularly desirable though in the engine manufacturing industry and in the hydraulic system manufacturing industry. In the engine manufacturing industry, with the recent increase of rotational speed and output of automobile and motorcycle engines, the importance of removal of gaseous contaminants in engine oil has increased. Excess gaseous contaminants in engine oil can cause serious difficulties, such as excess wear of lubricated parts due to oil starvation and a loss of efficiency of hydraulic systems such as valve lifters. In hydraulic systems, gaseous contaminants in the hydraulic fluid cause problems such as increasing the compressibility of the fluid, resulting in inaccuracy and inefficiency of hydraulic component operation.

The space available inside an engine compartment of an automobile and around a hydraulic system is generally not sufficient to accommodate a gas separator. Hence, a compact and efficient gas separator is desired which promotes durability, accuracy and efficiency of engines and hydraulic systems.

SUMMARY OF THE INVENTION

Accordingly, an object of the present invention is to provide a compact and efficient system gas separator for removing both entrained bubbles and dissolved gases from fluids such as engine oil and hydraulic fluid.

In accordance with the above objectives, the invention provides a compact and efficient system gas separator for removing both entrained bubbles and dissolved gases from fluids such as engine oil wherein a vortex flow chamber is provided with a gas removal pipe connected to a suction device.

More specifically, the invention provides such a gas separator device including a wall which defines a vortex flow chamber whose cross-sectional diameter may be reduced in a downstream direction. The vortex flow chamber is disposed at the suction-side pipe of an oil pump. A fluid introduction pipe introduces fluid into the vortex flow chamber in a tangential direction of the chamber. A gas removal pipe, extending into the vortex flow chamber and disposed substantially at the axial center of the vortex flow chamber, has a plurality of small pores formed therein for allowing gas-rich fluids to pass therethrough. The gas removal pipe is communicated with a suction device. The suction device may be a gear pump, a trochoid pump, a vane pump, a swirl pump, or an aspirated relief valve.

According to the invention, the gases in the fluid are treated at the suction-side of the pump and also at the suction side of the suction device, which provides a reduced pressure condition. As a result, entrained bubbles expand and agglomerate together to form large bubbles which are easily separated from the fluid to the axial center of the vortex flow chamber. The dissolved gases precipitate from the fluid under the reduced pressure condition and expand, agglomerate, and are separated. The separated gases near the axial center are removed through the gas removal pipe which communicates with a suction device.

The diameter of the vortex flow chamber may be reduced in a downstream direction. Such a reduced diameter chamber works efficiently to separate gases from liquid. The separation ability can be expressed as the difference of centrifugal forces working on the liquid and gases as follows:

$$S = m_1 \times (D/2) \times \omega^2 - m_2 \times (D/2) \times \omega^2 \quad (1)$$
$$= (D/2) \times \omega^2 (m_1 - m_2)$$

where
 $m_1$: mass of liquid in a small volume of fluid
 $m_2$: mass of gases in a same small volume of fluid
 D: diameter of the vortex flow chamber where the small volume of fluid flows
 $\omega$: angular velocity the small volume of the fluid
 $m_1$ is much greater $m_2$, and hence equation (1) can be approximated as:

$$S = (D/2) \times \omega^2 \times m_1 \quad (2)$$

If the flow rate of the fluid is constant, the angular velocity $\omega$ increases as the diameter D decreases. Equation (2) indicates the separation ability. S is proportional to $(D/2) \times \omega^2$, which means that S can be increased more effectively by reducing the diameter D of the vortex flow chamber along the stream of fluid.

BRIEF DESCRIPTION OF THE DRAWINGS

FIG. 2b shows a cross section of the separator of FIG. 2a taken along a line X-Y in FIG. 2a;

DESCRIPTION OF THE PREFERRED EMBODIMENTS

Referring to the accompanying drawings, preferred embodiments of the present invention will be described in detail.

Figure 1:
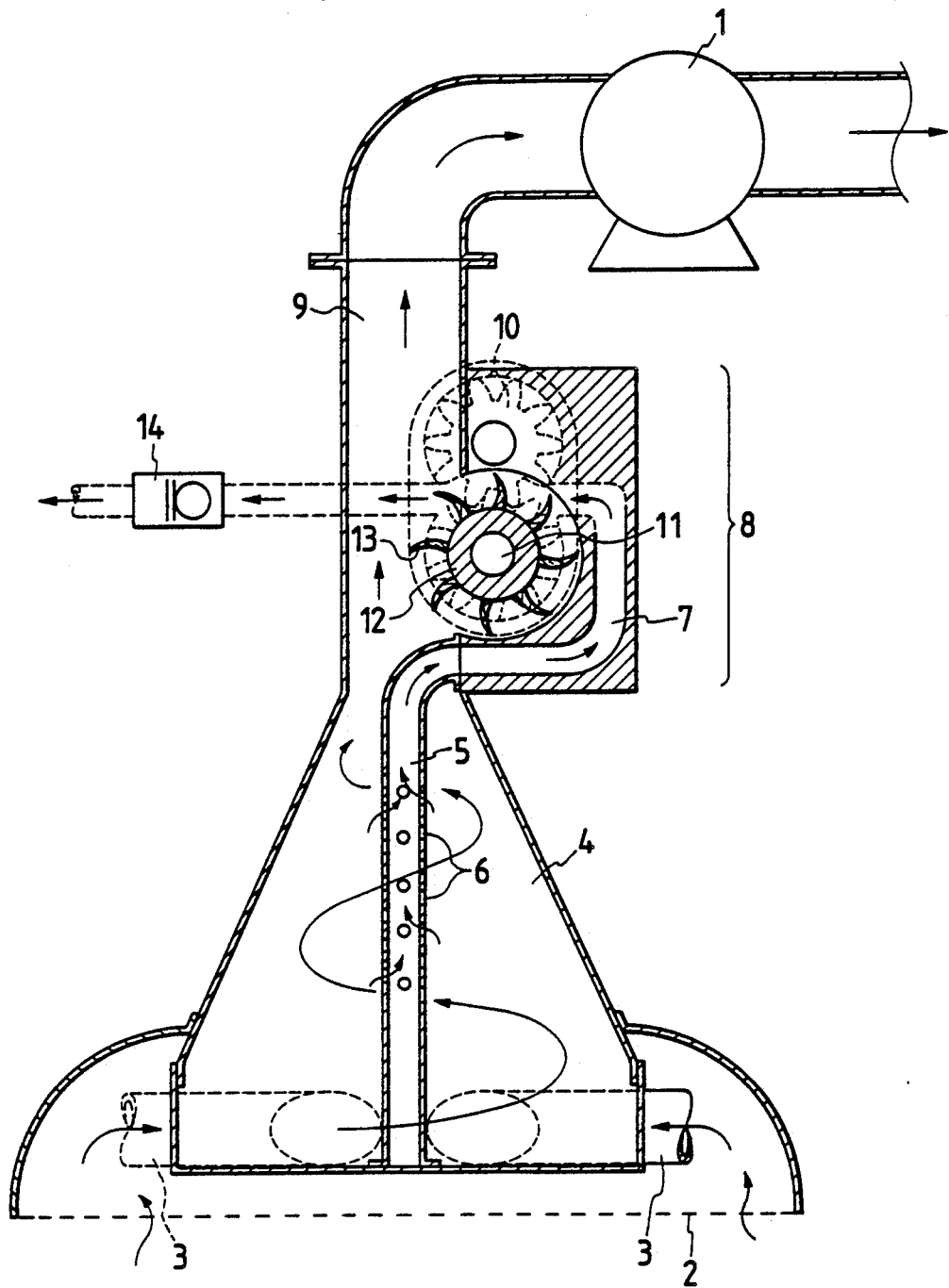
FIG. 1 is a cross-sectional view of a suction system gas separator constructed according to the present invention.

FIG. 1 shows a cross-sectional view of a separator for a four-cycle internal combustion engine, which separator is constructed in accordance with the present invention.

An oil pump 1 pumps up oil containing gases through an oil screen 2 and through two introduction pipes 3 which are disposed tangentially and symmetrically at the cylindrical bottom part of the vortex flow chamber 4. The oil and gases flow in a vortex pattern around the gas removal pipe 5 which is located at the axial center of the vortex flow chamber 4. The oil and gases separate in the chamber according to the difference of the centrifugal forces working on the oil and gases. The separated gases collect around the gas removal pipe 5.

The gas removal pipe 5 with a plurality of small pores 6 therein is connected with the suction port 7 of the gear pump device 8 which is disposed in the pipe line 9 from the vortex flow chamber 4 to the oil pump 1. The gear pump 10 is driven by the coaxial shaft 11 of the turbine 12 which is rotated when its turbine blades 13 are exposed to the oil flow in the pipe line 9.

The gas-rich oil around the gas removal pipe 5 is sucked by the gear pump 10 through the gas removal pipe 5 and pumped out through a check valve 14. The gas-free engine oil from the vortex flow chamber 4 is pumped out to engine parts which are to be lubricated or hydraulically operated.

Figure 2A:
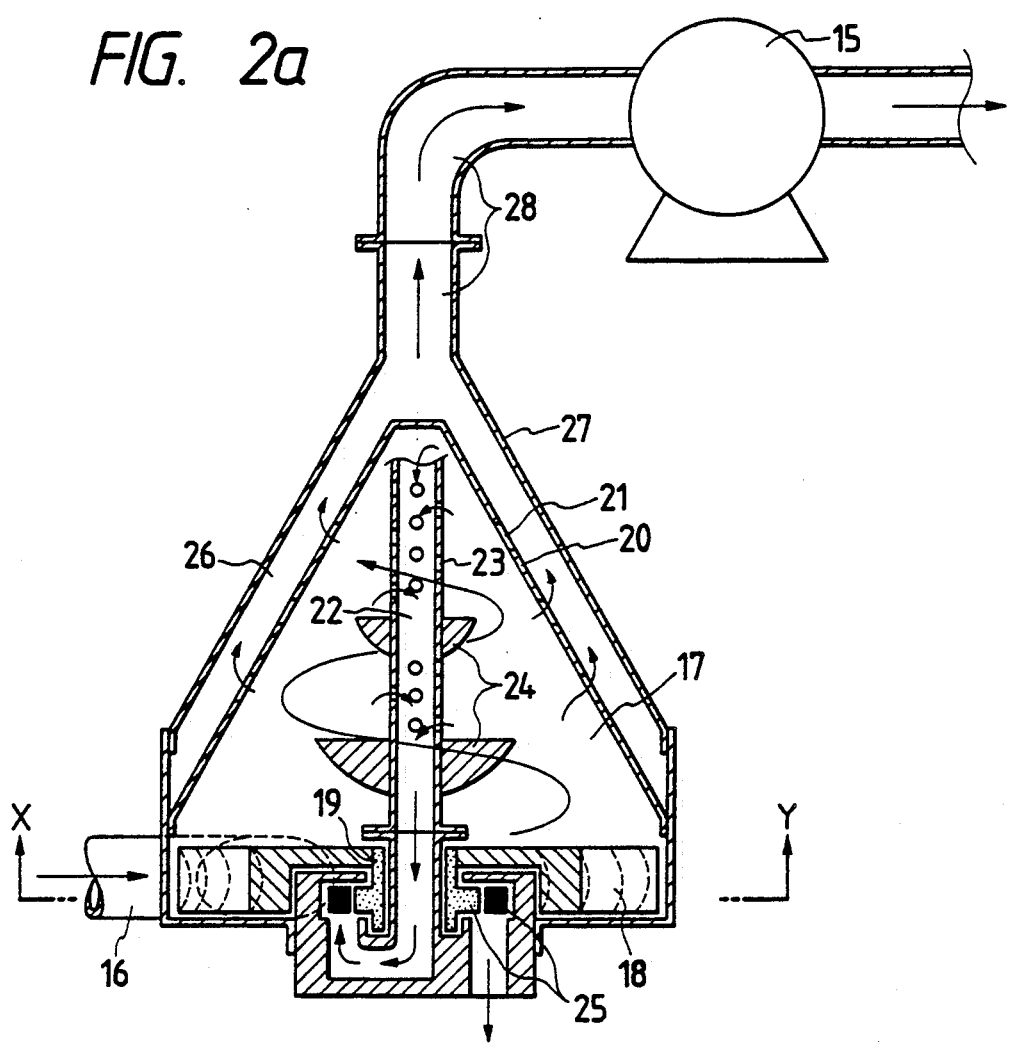
FIG. 2a is a cross-sectional view of a second embodiment of a suction system gas separator according to the present invention.
Figure 2B:
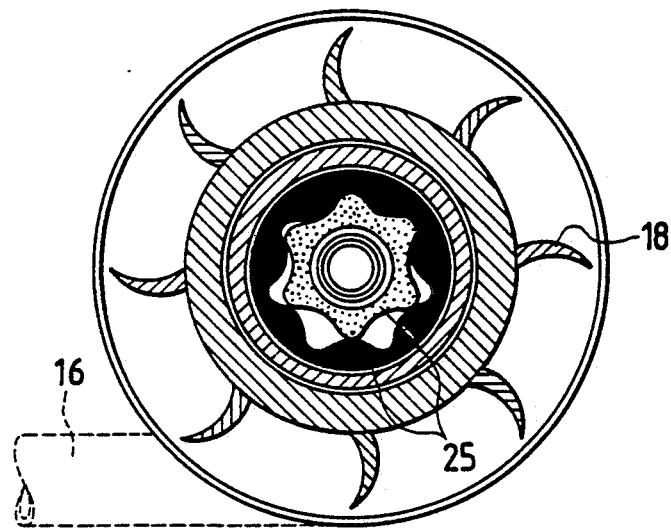

FIG. 2a shows another embodiment according to the present invention which is intended for separating gases from general fluids. FIG. 2b shows a cross section taken along the line X-Y in FIG. 2a. In this case, the suction device is a trochoid pump which is disposed at the bottom center of the vortex flow chamber.

A pump 15 pumps up fluid containing liquid and gases through an inlet pipe 16 disposed tangentially at the bottom cylindrical part of the vortex flow chamber 17. The fluid, which is introduced tangentially into the vortex flow chamber 17, rotates the turbine blades 18 which are disposed around and connected with the trochoid inner gear shaft 19.

The fluid flows upwardly in a vortex flow pattern which separates the gases from the liquid and drives the gases toward the axial center. The wall 20 defining the vortex flow chamber 17 has a plurality of small pores 21 which allow the gas-free liquid to pass therethrough. A gas removal pipe 22 with small pores 23 and von Kármán vortex street devices 24, which are effective in collecting gases at the axial center, are disposed at the axial center of the chamber and on the trochoid pump 25 in the chamber. The gases collected around the gas removal pipe 22 are pumped down through the pipe and are pumped out with the trochoid pump 25. The gas-free liquid passes through the small pores 21 formed in the wall 20 and flows into the outer chamber 26 which is defined by the wall 20 and the outer wall 27. The outer chamber 26 communicates with the pipe line 28 connected with the pump 15.

Figure 3:
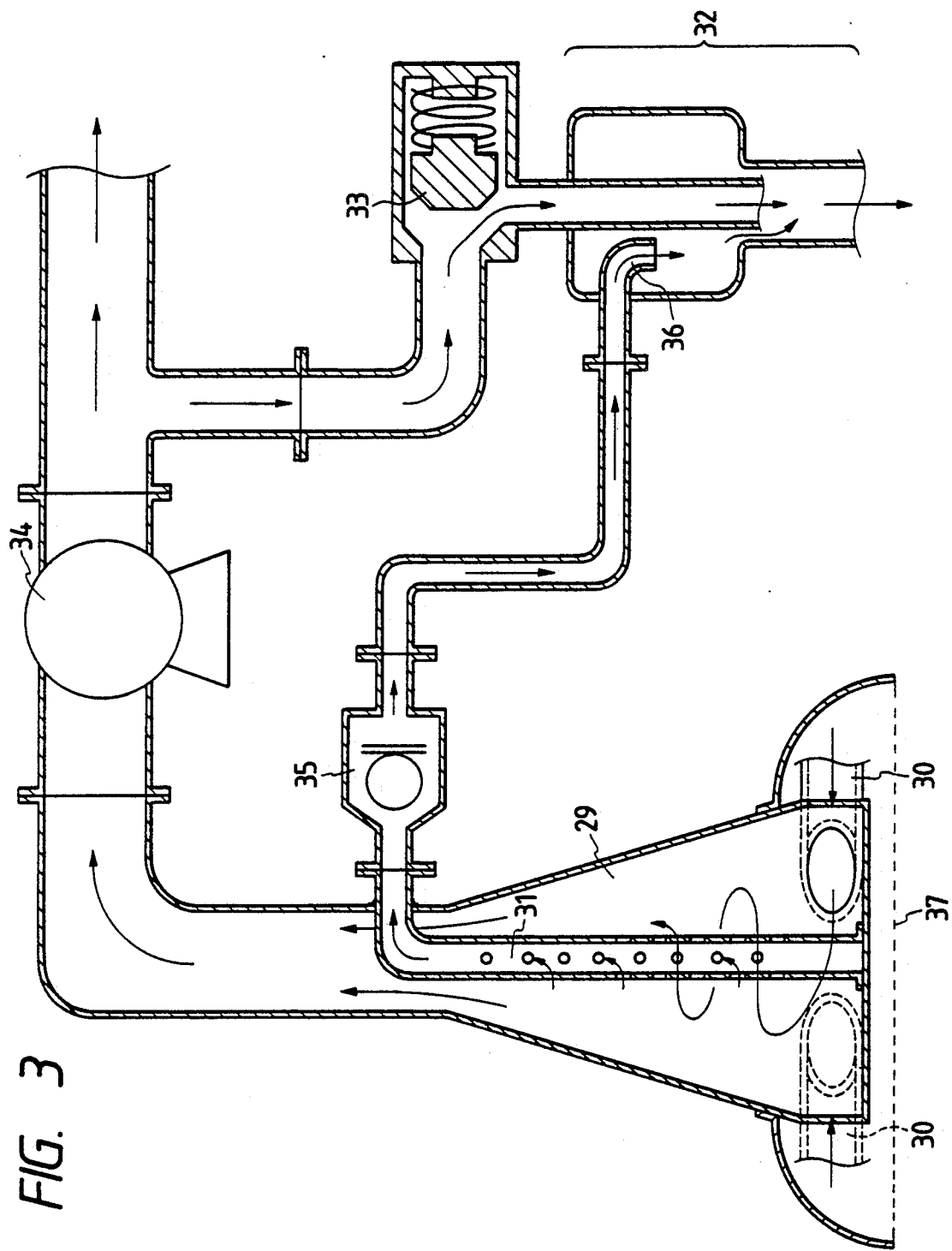
FIG. 3 is a cross-sectional view of a third embodiment of a suction system gas separator according to the present invention.

FIG. 3 shows a third embodiment constructed for separating gas from engine oil or hydraulic oil.

The vortex flow chamber 29, the introduction pipe 30, the gas removal pipe 31 and the oil screen 37 are similar to those of the first embodiment described above. The suction device, however, is different from those of the first and second embodiments.

In the third embodiment, the gas removal pipe 31 is communicated with the aspirated device 32 which utilizes the oil stream released out of the relief valve 33 disposed at the outlet side of the oil pump 34. The gas-rich oil around the gas removal pipe 31 is sucked by the aspirator 32 and removed through the check valve 35, the aspirated pipe 36 and the aspirator 32. The check valve 35 is provided to protect from reverse flow of air through the aspirator 32 when the relief valve 33 is shut.

Figure 4:
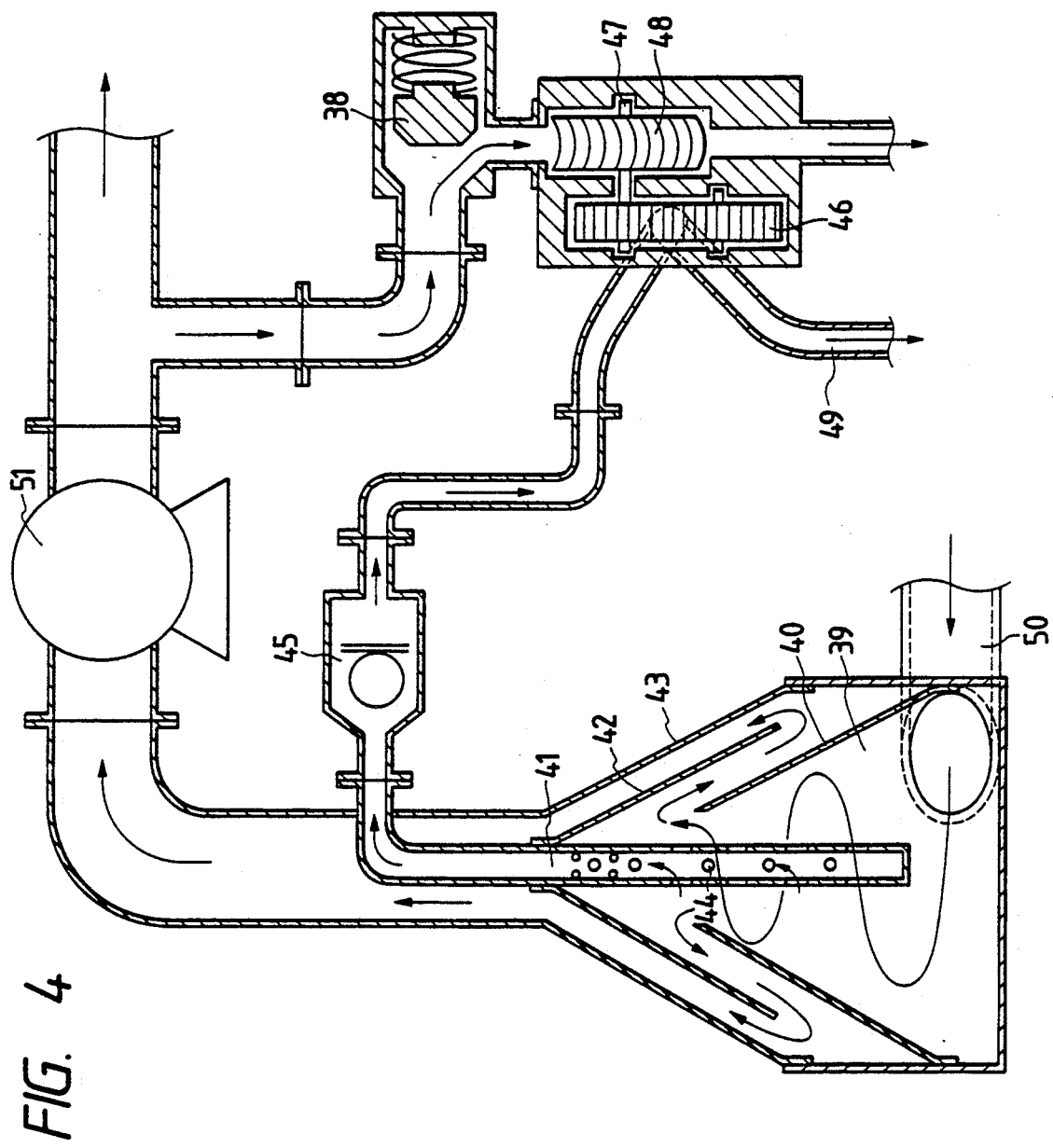
FIG. 4 is a cross-sectional view of a fourth embodiment according to the present invention.

FIG. 4 shows another embodiment which utilizes a similar oil stream which flows out of a relief valve as in the third embodiment. The vortex flow chamber 39 which is defined by the inner wall 40 of which upperside is opened around the gas removal pipe 41. The inner wall 40 is overlapped by the cone wall 42 which is fixed to the gas removal pipe 41. Such a zig-zag oil passage formed by the inner wall 40, the cone wall 42 and the outer wall 43 makes the bubbles diffcult to flow out of the inside space of the cone wall 42. The gas removal pipe 41 with small holes 44 removes the gas mainly out of the inside space of the cone wall 42 and leads it to the check valve 45, then to the gear pump 46. The gear pump 46 works with the co-axial shaft 47 of the turbine 48 whose blades are exposed to the oil stream passed from the relief valve 38. The turbine 48 is rotated by the oil stream and the gear pump 46 is driven by the turbine rotation. The gas-rich oil around the gas removal pipe 41 is pumped up by the gear pump 46 and is drained through the drain pipe 49. The introduction pipe 50 and the oil pump 51 are similar to other embodiments.

What is claimed is:

1. A suction system gas separator device for removing both entrained bubbles and dissolved gases from fluids, comprising:
   a pump having a suction-side pipe and an outlet pipe;
   a vortex flow chamber disposed at said suction-side pipe of said pump;
   fluid introduction means for introducing fluid into said chamber in a tangential direction of said chamber;
   a gas removal pipe extending into said chamber and disposed substantially at an axial center of said chamber, a plurality of small pores being formed in said gas removal pipe for allowing gas-rich fluid to pass therethrough;
   a suction device connected with said gas removal pipe, said suction device creating a reduction pressure condition;
   a main fluid outlet passage means connected to said suction-side pipe of said pump for passing fluid stripped of gaseous contaminants from said chamber to said pump; and
   fluid outlet passage means of said suction device for discharging gas-rich fluid from said gas removal pipe.

2. The separator device of claim 1, wherein the diameter of said vortex flow chamber is reduced in a downstream direction in said vortex flow chamber.

3. The separator device of claim 1, wherein said suction device is operated by the fluid discharged from said outlet pipe of said pump.

4. The separator device of claim 1, wherein the upper wall defining said vortex flow chamber is opened and said upper wall is overlapped by another cone wall fixed to said gas removal pipe.

5. The separator device of claim 1, further comprising a screen covering an inlet opening of said introduction means for filtration of coarse solids.

6. The separator device of claim 1, further comprising a check valve disposed in said outlet passage means of said suction device.

7. The separator device of claim 1, wherein said suction device is an aspirator.

8. The separator device of claim 7, wherein said aspirator is connected to said outlet pipe of said pump so as to provide a motive fluid for said aspirator to thereby entrain said gas-rich fluid from said gas removal pipe.

* * * * *